United States Patent

Mammoser et al.

(10) Patent No.: US 10,447,452 B2
(45) Date of Patent: Oct. 15, 2019

(54) HARDWARE CONTROLLED RECEIVE RESPONSE GENERATION

(71) Applicant: Nitero Pty Ltd., Fitzroy, Victoria (AU)

(72) Inventors: Douglas A. Mammoser, Austin, TX (US); Sebastian Ahmed, Austin, TX (US)

(73) Assignees: ADVANCED MICRO DEVICES, INC., Sunnyvale, CA (US); AMD FAR EAST LTD., Sydney (AU)

( * ) Notice: Subject to any disclaimer, the term of this patent is extended or adjusted under 35 U.S.C. 154(b) by 381 days.

(21) Appl. No.: 14/798,139

(22) Filed: Jul. 13, 2015

(65) Prior Publication Data

US 2017/0019231 A1 Jan. 19, 2017

(51) Int. Cl.
*H04L 5/00* (2006.01)
*H04L 1/18* (2006.01)
*H04L 1/16* (2006.01)

(52) U.S. Cl.
CPC ............. *H04L 5/0055* (2013.01); *H04L 1/18* (2013.01); *H04L 1/1607* (2013.01)

(58) Field of Classification Search
CPC ........ H04L 5/0055; H04L 1/18; H04L 1/1607
See application file for complete search history.

(56) References Cited

U.S. PATENT DOCUMENTS

| | | | |
|---|---|---|---|
| 2003/0181173 A1* | 9/2003 | Sugar | H01Q 3/28 455/126 |
| 2009/0310590 A1* | 12/2009 | Kish | H01Q 21/29 370/345 |
| 2011/0119492 A1* | 5/2011 | Palanigounder | H04L 63/0884 713/171 |
| 2012/0014335 A1* | 1/2012 | Adachi | H04W 48/08 370/329 |
| 2014/0063177 A1* | 3/2014 | Tian | H04N 7/15 348/14.07 |
| 2015/0124786 A1* | 5/2015 | Asterjadhi | H04W 28/18 370/336 |
| 2015/0146607 A1* | 5/2015 | Abraham | H04L 1/1685 370/312 |
| 2015/0146648 A1* | 5/2015 | Viger | H04L 1/1621 370/329 |
| 2015/0229759 A1* | 8/2015 | Wu | H04M 3/42042 455/567 |

\* cited by examiner

*Primary Examiner* — Walter J Divito
*Assistant Examiner* — Anthony Luo
(74) *Attorney, Agent, or Firm* — Hickman Palermo Becker Bingham LLP; Edward A. Becker

(57) ABSTRACT

An approach is provided for generating response frames. Incoming frames are processed by a receive controller to determine type and attributes. Based on the type and the attributes of the incoming frame, a response frame is constructed and transmitted by a transmit controller. A response frame is constructed by setting values in a frame template. A block ACK can be implemented by means of a block ACK scoreboard.

16 Claims, 2 Drawing Sheets

HARDWARE CONTROLLED RECEIVE RESPONSE GENERATION

FIELD

The disclosed technologies relate generally to wireless communications, and more particularly, to determining whether to send a response frame to an incoming frame, and if so, what contents to include in the response frame.

BACKGROUND

The availability of unlicensed millimeter wave (mm-wave) radio frequency (RF) bands is spurring the development of mainstream applications that use mm-wave wireless technologies. For example, the Institute of Electrical and Electronics Engineers (IEEE) 802.11ad standard, sometimes referred to as "Wi-Gig", specifies a data rate of up to approximately 7 Gigabits per second over the 60 GHz frequency band for consumer applications such as wireless transmission of high-definition video.

Wireless communications devices that use high frequency bands, such as the 60 GHz frequency band, require that large and high throughput packets be constructed and transmitted with very precise timing requirements.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are described with reference to figures in which like reference numerals refer to corresponding elements throughout the figures.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An approach is hereby provided to implement a function of the 802.11 ad standard requiring a response frame to be sent to an incoming frame. Certain types of frames require an immediate response with a very precise timing requirement of between 3 and 3.5 microseconds following the receipt of the incoming frame.

Figure 1:
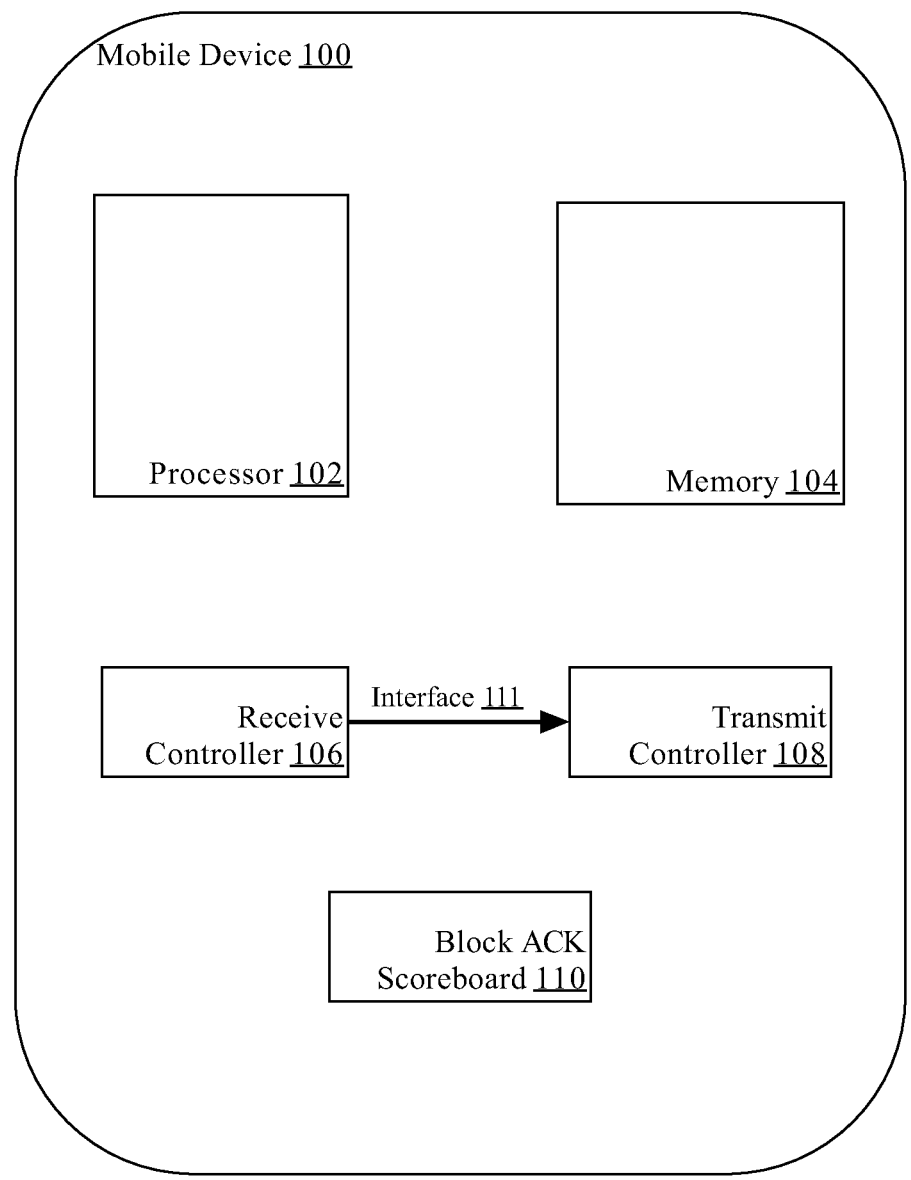
FIG. 1 depicts an example mobile device in which embodiments may be implemented.

FIG. 1 depicts an example mobile device 100 in which embodiments of the present disclosure may be implemented. Mobile device 100 includes a processor 102 and memory 104, and may include other components. Mobile device 100 also includes a receive controller 106 and a transmit controller 108, connected by an interface 111. Mobile device 100 also includes a block acknowledgement (ACK) scoreboard 110. Example implementations of a mobile device 100 include, without limitation, smart phones, tablet computing devices, laptop computers, personal digital assistants, etc. In one embodiment, a receive controller 106 and a transmit controller 108 can be operatively coupled and implemented as components or elements of a Radio Frequency Integrated Circuits (RFICs) that cover wide frequency ranges including, without limitation, the 60 GHZ frequency band.

To improve efficiency, and speed up processing, receive controller 106 and transmit controller 108 may be implemented directly in hardware without the use of a Media Access Control (MAC) processor. Implementing the controllers directly in hardware aids in meeting the timing requirements of the response frame transmit, and allows for a lower power, more timing accurate implementation than if the controllers were implemented in software using a MAC processor.

An interface 111 is provided between receive controller 106 and transmit controller 108. In one embodiment, the interface may be a sideband channel implemented in hardware, such as an on-chip, component-to-component interface comprising a set of wires used to directly communicate the response transmit frame and associated data from the receive controller to the transmit controller.

A block ACK scoreboard 110 is provided. In one embodiment, instead of transmitting an individual response frame for every incoming frame, multiple incoming frames can be acknowledged together using a single response frame called a block acknowledgement or "block ACK." In one embodiment, a block ACK is implemented using a block ACK scoreboard. A block ACK scoreboard may be a hashtable or other suitable structure in which a record is kept of the receive status (successful/unsuccessful) of one or more incoming frames. For example, a block ACK scoreboard may be implemented as a record of frames to be acknowledged, along with an associated bit indicating the success or failure of the transmission. At an appropriate time, a block ACK can be sent to the appropriate receiving station, with each associated bit indicating which frames have been successfully received and which frames have failed.

Figure 2:
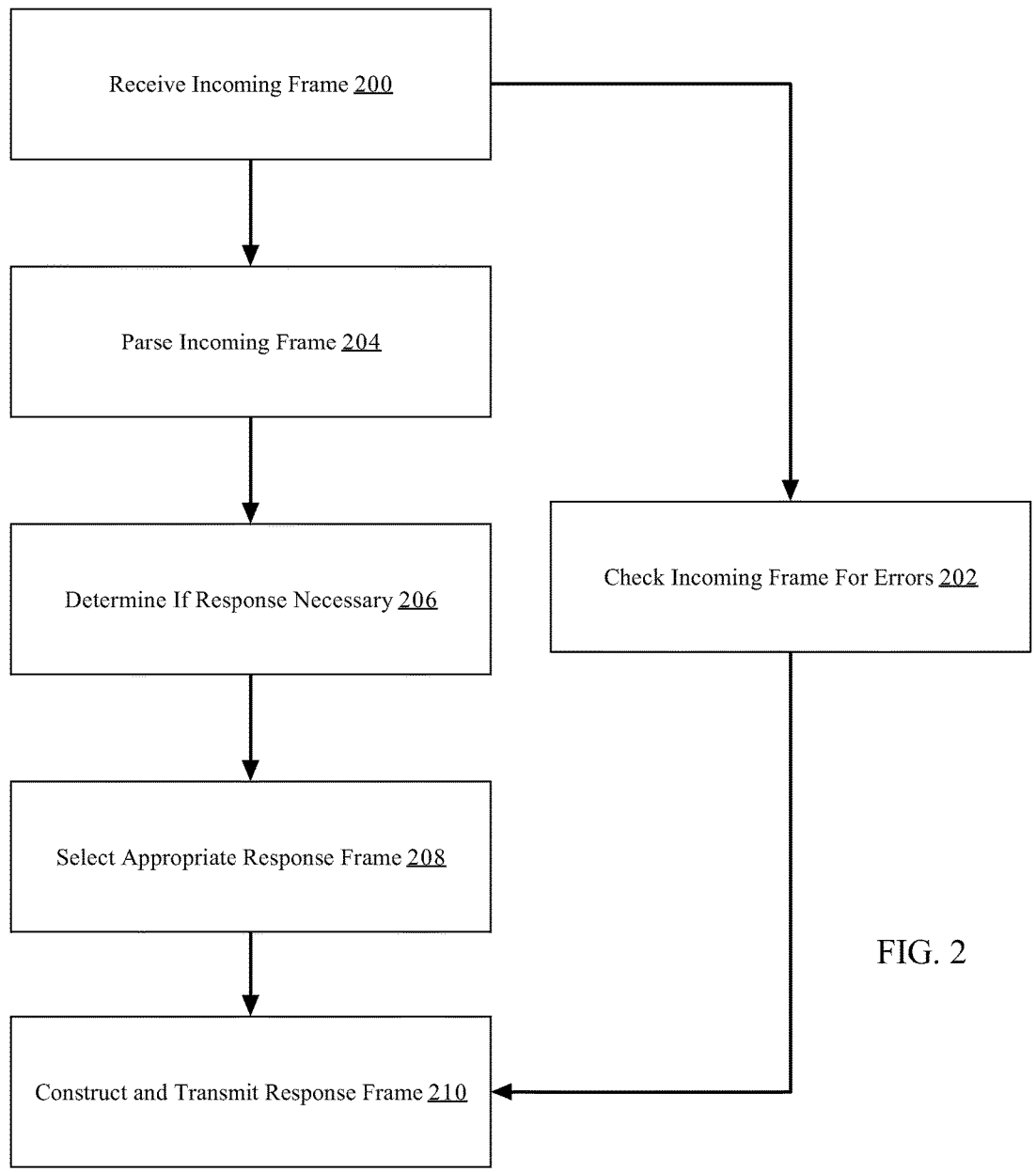
FIG. 2 depicts a flow chart of a data processing method according to an embodiment.

FIG. 2 depicts a flow chart of a data processing method according to one embodiment of the subject matter. At step 200, an incoming frame is received by a receive controller 106. The incoming frame can be received via a wireless transmission.

At step 202, the receive controller checks the incoming frame for errors. In one embodiment, the error checking step can include testing the incoming frame using an algorithm such as a cyclic redundancy check performed by the receive controller 106, and checking the result of that operation against some expected result. Other types of error checking can include a checksum or other error-detecting code to ensure that the incoming frame has been properly received in its entirety and processed. In one embodiment, step 202 is performed in parallel with or at approximately the same time as steps 204-208. Upon completion of the error checking and a determination that the incoming frame was received without error, receive controller 106 can request the transmit controller 108 to transmit the response frame as detailed below in step 210.

At step 204, and in parallel with step 202, the incoming frame is parsed. In particular, the parsing determines the incoming frame's type as well as any other attributes that may be taken into consideration for responding, for example, Source Address, Destination Address, ACK Policy, Type, Subtype, Control Frame Extension, Traffic ID (TID). For example, the incoming frame can be checked to ensure that it has been received by the correct receive controller 106, in other words, that the frame has been received by the receive controller 106 to which it was addressed, that is, whether the incoming frame had a destination media access control address (MAC address) that matches the current MAC address of the station (STA) that received the frame. The income frame may be parsed to only determine the information required to construct a response frame.

At step 206, and in parallel with step 202, a determination is made, based on the information obtained in step 204, whether a response is mandated or not. For example, certain types of incoming frames require no response. Other types of incoming frames require a specific type of response. Whether or not a response is required is determined by the type of frame received and its associated attributes, and can be based on requirements in the 802.11ad specification. If no response is required, no further action is required. If a response is required, the method proceeds to step 208.

At step 208, and in parallel with step 202, the appropriate response frame is selected for transmission. In one embodiment, the response frame is selected using type-to-type mapping. Type-to-type mapping may be a listing of various frame types together with their corresponding response frame type. In one embodiment, type-to-type mapping may be implemented using a table, a hashtable, or any other suitable means of storing a record of which response frame type is required for which incoming frame type.

At step 210, if the error checking in step 202 has validated the incoming frame, the appropriate response frame is constructed and transmitted based on the indication from the receive controller 106. In one embodiment, the response frame is constructed from pre-defined response frame templates, by substituting fields within the frame template with values required for the appropriate response frame. A frame template may be structured in the same way as a frame, but with values such as destination address, frame duration, frame type, and other, maintained as blank fields, in other words, attributes lacking a defined value. Using predefined templates shortens the time required to construct a new frame, thereby increasing processing speed and improving efficiency and allowing the timing requirements for the response to be satisfied.

A frame template contains one or more blank fields, which may be located in the transmit vector, the MAC header, or in the frame body. Upon receiving an incoming frame, and determining that an response frame should be sent in response, a determination is made, based on attributes of the incoming frame, of the type of response frame that should be sent. Once an response frame type is determined, the corresponding frame template is selected. The blank values in the frame template can then be replaced with values obtained from the incoming frame. For example, if the incoming frame has an "From:" attribute of "STATION1", the "To:" field in the response template would be set to "STATION1." Other attributes of the incoming frame can be used to derive values for other blank fields. For example, the modulation and coding scheme (MCS) of the response frame is determined from the MCS of the incoming frame based on a table lookup. Additionally, attributes of the incoming frame can be used to determine certain settings on the transmit controller, for example, antenna direction and gain.

In one embodiment, the duration field of the response frame may be varied depending on the attributes of the incoming frame, such as the duration field of the incoming frame. The duration field of the response frame can be determined as required by the 802.11ad specification, taking into account the processing time and the appropriate inter-frame space (IFS) window.

In one embodiment, the response frame is constructed such that the transmission starts within a certain timing window. For example, the timing window for SIFS is defined in the relevant specification to range between 3.0 and 3.5 microseconds, but the timing window may vary as appropriate depending on the particular operating frequency and other factors. In one embodiment, the timing window may be a static programmable value, determined in advance by a system administrator. In another embodiment, the timing window may be a per-frame amount as indicated by the frame controller 106.

In one embodiment, the settings on the transmit controller 108 can be adjusted to match certain settings on the station to which it is directed. For example, the antenna configuration and power-amplifier gain on the response frame can be set to the same values of antenna configuration and power-amplifier gain of the station to which the response frame is directed. The adjustment of the transmit controller 108 settings can be performed prior to the construction and transmission of the response frame.

In one embodiment, the settings on transmit controller 108 response frame can be determined from the response frame's attributes. For example, the incoming frame may contain information about the MCS and power-amplifier gain, and digital gain compensation values of the station from which it was sent. The transmit controller 108 settings can be adjusted to match these values in order to make for an optimal transmission to the receiving station.

The approaches described herein may be selectively implemented on particular devices. For example, the approaches may be implemented on mobile devices, such as a mobile device 100, where lower processor speeds leading to lower power consumption while maintaining high data throughput is desirable. The use of the approaches described herein may be determined, for example, based upon a configuration of a mobile device, or the use may be selectable by a user, for example, via an application on the mobile device.

In the foregoing specification, embodiments are described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. An apparatus, comprising:
   a frame receive controller;
   a frame transmit controller;
   a sideband channel hardware interface operatively coupled to the frame receive controller and the frame transmit controller; and
   response logic operable to respond to an incoming frame by:
      determining one or more values included in the incoming frame;
      constructing a response frame that has one or more values based on, at least in part, the one or more values included in the incoming frame by:
      determining a required type of the response frame based upon the one or more values included in the incoming frame,
      selecting, from a plurality of predefined response frame templates of different types, a particular predefined response frame template of the required type determined based upon the one or more values included in the incoming frame, wherein each predefined response frame template from the plurality of predefined response frame templates includes a plurality of fields with one or more blank fields, and
      replacing the one or more blank fields in the particular predefined response frame template with values from the one or more values included in the incoming frame; and
      transmitting the response frame within a specified response time;
   wherein the response logic is implemented without a media access control processor.

2. The apparatus of claim 1, further comprising:
   determining and setting a value for a duration field of the response frame based, at least in part on, the one or more values included in the incoming frame.

3. The apparatus of claim 1, wherein the one or more values included in the incoming frame are one or more of: a Source Address, a Destination Address, an acknowledgment Policy, a Type, a Subtype, a Control Frame Extension, or a Traffic ID (TID).

4. The apparatus of claim 1, wherein:
   the apparatus further comprises a Block acknowledgment scoreboard that specifies a receive status for each incoming frame of a plurality of incoming frames, and
   the response logic is further operable to generate and transmit a block acknowledge that specifies the receive status for each incoming frame of the plurality of incoming frames.

5. The apparatus of claim 1, wherein the response logic is further operable to:
   adjust an antenna configuration at the frame transmit controller based on, at least in part, a destination address of the response frame.

6. The apparatus of claim 1, wherein the response logic is further operable to:
   adjust a power amplifier gain value at the frame transmit controller based on, at least in part, a destination address of the response frame.

7. The apparatus of claim 1, wherein the response logic is further operable to calculate a response frame duration for the response frame.

8. The apparatus of claim 1, wherein the incoming frame and the response frame conform to the IEEE 802.11 specification.

9. A method for generating a response frame at an apparatus, the method comprising:
   responding, by response logic implemented on the apparatus, to an incoming frame by:
      determining one or more values included in the incoming frame;
      constructing a response frame that has one or more values based on, at least in part, the one or more values included in the incoming frame by:
         determining a required type of the response frame based upon the one or more values included in the incoming frame,
         selecting, from a plurality of predefined response frame templates of different types, a particular predefined response frame template of the required type determined based upon the one or more values included in the incoming frame, wherein each predefined response frame template from the plurality of predefined response frame templates includes a plurality of fields with one or more blank fields, and
         replacing the one or more blank fields in the particular predefined response frame template with values from the one or more values included in the incoming frame; and
      transmitting the response frame within a specified response time;
   wherein the response logic is implemented without a media access control processor.

10. The method of claim 9, further comprising:
    determining, by the response logic implemented on the apparatus, and setting a value for a duration field of the response frame based, at least in part on, the one or more values included in the incoming frame.

11. The method of claim 9, wherein the one or more values included in the incoming frame are one or more of: a Source Address, a Destination Address, an acknowledgment Policy, a Type, a Subtype, a Control Frame Extension, or a Traffic ID (TID).

12. The method of claim 9, further comprising:
    generating, by the response logic implemented on the apparatus, a Block acknowledgment scoreboard that specifies a receive status for each incoming frame of a plurality of incoming frames, and
    generating and transmitting, by the response logic implemented on the apparatus, a block acknowledge that specifies the receive status for each incoming frame of the plurality of incoming frames.

13. The method of claim 9, further comprising adjusting, by the response logic implemented on the apparatus, an antenna configuration at a frame transmit controller of the apparatus based on, at least in part, a destination address of the response frame.

14. The method of claim 9, further comprising adjusting, by the response logic implemented on the apparatus, a power amplifier gain value at a frame transmit controller of the apparatus based on, at least in part, a destination address of the response frame.

15. The method of claim 9, further comprising calculating, by the response logic implemented on the apparatus, a response frame duration for the response frame.

16. The method of claim 9, wherein the incoming frame and the response frame conform to the IEEE 802.11 specification.

* * * * *